US00H002162H

(19) United States
(12) Statutory Invention Registration
Rivera et al.

(10) Reg. No.: US H2162 H
(43) Published: Jul. 4, 2006

(54) CONTAINER CONVEYOR LOAD TRANSFER

(75) Inventors: Rafael Rivera, Magnolia, NJ (US); Christopher Clemmer, Allentown, PA (US)

(73) Assignee: The United States of America as represented by the Secretary of the Navy, Washington, DC (US)

(21) Appl. No.: 10/650,679

(22) Filed: Aug. 29, 2003

(51) Int. Cl.
*B63B 27/00* (2006.01)

(52) U.S. Cl. ..... 414/139.9; 414/139.4; 414/140.3; 414/141; 414/141.3; 414/141.4; 414/141.6; 414/266

(58) Field of Classification Search ..... 414/139.9, 414/139.4, 140.3, 141.3, 141, 239, 236, 255, 414/261, 141.4, 141.6; 212/324–26
See application file for complete search history.

(56) References Cited

U.S. PATENT DOCUMENTS

| | | | | | |
|---|---|---|---|---|---|
| 3,559,822 | A | * | 2/1971 | Lichtenford et al. | 414/140.3 |
| 4,172,685 | A | * | 10/1979 | Nabeshima et al. | 414/139.7 |
| 4,293,077 | A | * | 10/1981 | Makino | 212/325 |
| 5,039,275 | A | * | 8/1991 | Ide | 414/803 |
| 5,775,866 | A | * | 7/1998 | Tax et al. | 414/140.3 |

FOREIGN PATENT DOCUMENTS

DE 2622698 A * 11/1977

WO WO 200071452 A1 * 11/2000

* cited by examiner

*Primary Examiner*—M. Clement
(74) *Attorney, Agent, or Firm*—Jacob Shuster

(57) ABSTRACT

A wheel supported conveyor having a central platform crane section disposed between opposite end crane sections is positioned in underlying relation to a container holding spreader of a dockside terminal crane for transfer of containers to and from the chassis of trucks moved into loading positions without obstruction along parallel spaced passage lanes formed in the end crane sections. Sections of a roller track are respectively associated with each of the conveyor crane sections for displacement of the containers laterally between a common track path and the truck passage lanes. Container spreaders are slidably mounted on the end crane sections effecting said lateral displacement of containers between the truck passage lanes and the common roller track path.

3 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONTAINER CONVEYOR LOAD TRANSFER

STATEMENT OF GOVERNMENT INTEREST

The invention described herein may be manufactured and used by or for the Government of the United States of America for governmental purposes without the payment of any royalties thereon or therefore.

The present invention relates to the transfer of standard load containers between adjacent locations such as dockside positioned cranes and land-based vehicles.

BACKGROUND OF THE INVENTION

Current arrangements for transfer of containers to and from dockside located marines vessels or ships involve use of a relatively large marine terminal crane. In large sea ports, delivery and retrieval of containers from the marine terminal crane is a bottleneck so as to require use of additional equipment and time consuming container transfer, leading to a line up of delivery vehicles awaiting container pickup. It is therefore an important object of the present invention to provide a method and apparatus for more efficient and less time consuming transfer of containers between a marine terminal crane and land based vehicles such as trucks and railroad trains.

SUMMARY OF THE INVENTION

Pursuant to the present invention, a roller track is formed by aligned track sections respectively underlying wheeled crane units of a wheeled conveyor to which such track sections are respectively connected for transfer of containers therebetween. The central crane unit features a prepping platform through which containers of different sizes on its roller track section may be adjustably positioned in alignment under the spreader bar of a marine terminal crane for vertical transfer of containers to and from the central crane unit after the containers are delivered to and from a pair of end crane units through which parallel spaced track lanes are established on opposite sides of the prepping platform on the central crane unit for passage of trucks with containers thereon. Containers are transferred, by laterally slidable spreaders, between vehicle trucks and the roller track sections associated with the end crane units without obstruction.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
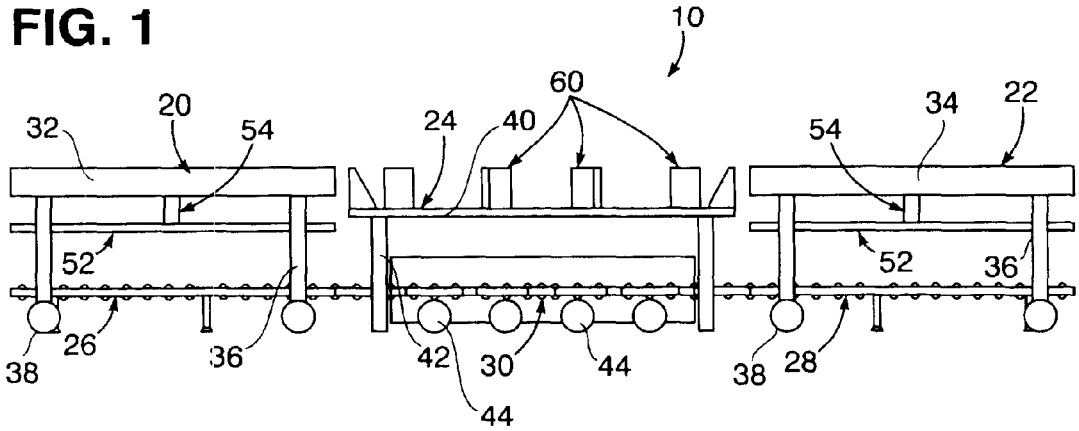
FIG. 1 is a side elevation view of an assembled conveyor loader constructed in accordance with one embodiment of the present invention.
Figure 2:
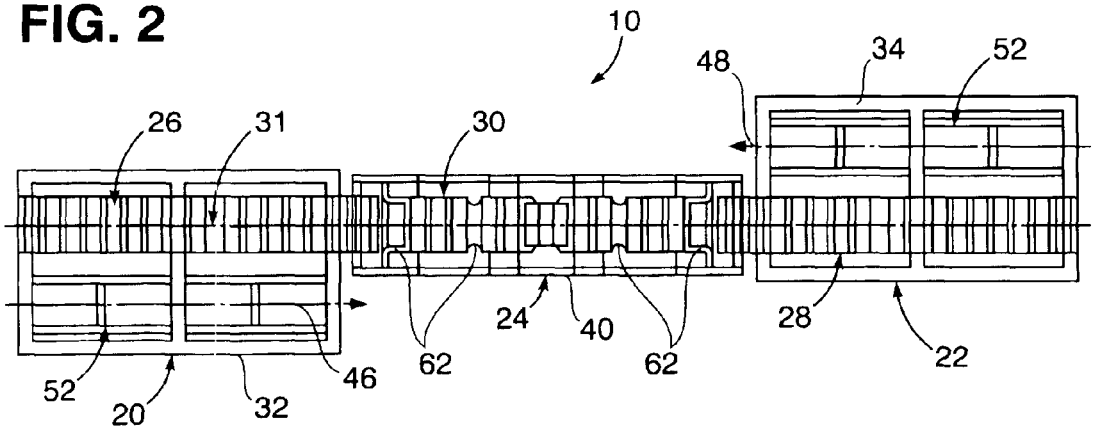
FIG. 2 is a bottom elevation view of the conveyor loader illustrated in FIG. 1.
Figure 3:
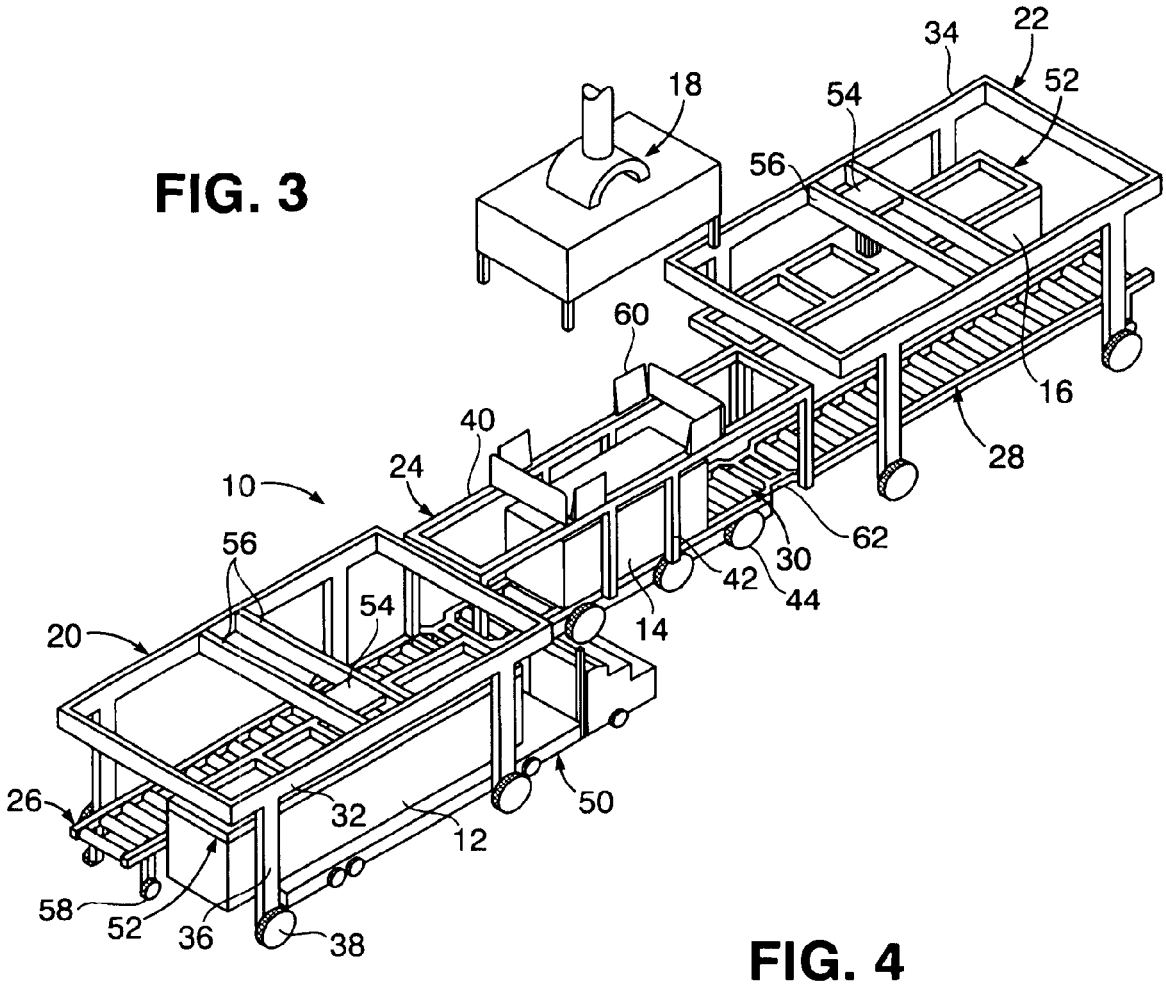
FIG. 3 is a perspective view of the conveyor loader illustrated in FIGS. 1 and 2, with containers positioned therein and in underlying relation to a terminal crane spreader.
Figure 4:
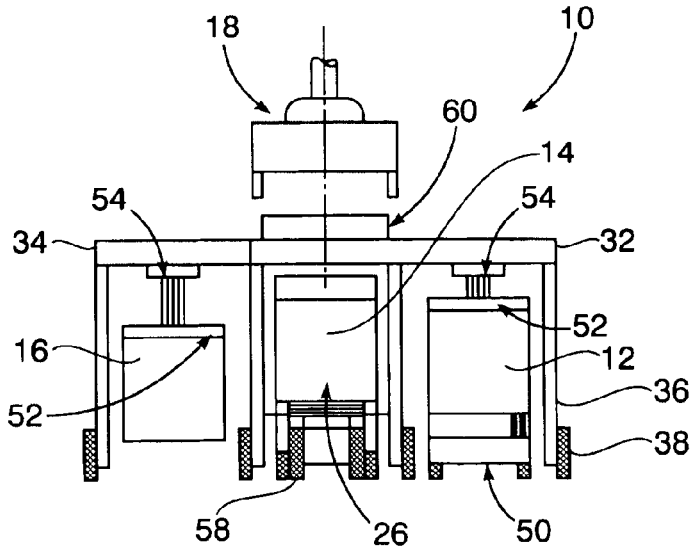
FIG. 4 is an end view of the conveyor loader shown in FIG. 3, with containers therein.

Referring now to the drawings in detail, FIGS. 1 and 2 illustrate through side and bottom elevation views a wheeled conveyor 10 before transfer thereto of three containers 12, 14 and 16 as shown positioned thereon in FIGS. 3 and 4, illustrating the conveyor 10 at a location underlying a spreader bar 18 depending from a conventional type of marine terminal crane as generally known in the art. The conveyor 10 as shown in FIGS. 1–4 has two end crane units 20 and 22 interconnected by a prepping platform type of central crane unit 24. The conveyor crane units 20, 22 and 24 are respectively provided with a roller track section 26, 28 and 30 secured to the bottom portions of the crane units 20, 22 and 24 in alignment so as to establish a common roller path 31, as denoted in FIG. 2, along which movement of containers may be guided during travel between the conveyor crane end units 20 and 22 to and from the central crane unit 24.

Each of the conveyor crane units 20, 22 and 24 is of a similar construction having wheel support. Thus, the end crane units 20 and 22 have rectangular top frames 32 and 34 from which gantry legs 36 extend downwardly to lower ends on which wheels 38 are mounted for travel surface support of the end crane units 20 and 22 with their top frames 32 and 34 in horizontal alignment with each other at an upper level as shown in FIG. 4. Such top frames 32 and 34 are of a width greater than that of a top frame 40 associated with the central crane unit 24 positioned at a lower level below the horizontally aligned top frames 32 and 34 of the end crane units 20 and 22 as shown in FIGS. 1 and 3. Gantry legs 42 extend downwardly from the top frame 40 of the central crane unit 24, with wheels 44 mounted thereon for travel surface support of the central crane unit 24 with the horizontal top frames 32 and 34 of the end crane units 20 and 22, projecting laterally in opposite directions from the top frame 40 of the central crane unit 24 as shown in FIGS. 2 and 3. A pair of parallel spaced travel lane paths 46 and 48 as designated in FIG. 2 are thereby established underlying the top frames 32 and 34 for load transport trucks, such as the motor truck 50 as shown in FIG. 3 having the container 12 positioned on its chassis. The width dimensions of the end crane units 20 and 22 established by their top frames 32 and 34 relative that of the top frame 40 of the central unit 24 is such as to accommodate passage of the trucks 50 along the travel paths 46 and 48 past opposite sides of the central unit 24 with the container 12 or 16 thereon.

Each of the end crane units 20 and 22 also has a stack spreader 52 slidably suspended from the top frames 32 and 34 by spreader support elements 54 which are slidably displaceable laterally along the width of the top frames 32 and 34 between track bars 56 as shown in FIG. 3. Thus, the container 12 attachable to the spreader 52 may be displaced between a position overlying the truck 50 and the roller track 26 supported by wheels 58 on the truck 50 as shown in FIGS. 3 and 4 to establish the roller track travel path 46 or 48 in laterally spaced relation to each other as shown in FIG. 2.

The top frame 40 of the central crane unit 24 has a pair of alignment hopper guides 60 as shown in FIGS. 1, 3 and 4 adjustably mounted thereon through which containers of different size, such as the smaller container 14, may be vertically transferred by the crane spreader bar 18 between a marine terminal crane and the roller track section 30 associated with the central crane unit 24. As shown in FIGS. 2 and 3, such roller track section 30 has recesses 62 at selected locations thereon to accommodate lock installation and removal.

It will be apparent from the foregoing description that the conveyor 10 provides two truck lanes along the travel paths 46 and 48 laterally spaced from the common track roller path 31 for use of the three crane units 20, 22 and 24 so as to substantially reduce the time required for transfer of different sized containers to and from a truck chassis positioned under the top frames 32 and 34 of the crane units 20 and 22. The central crane unit 24 is positioned in alignment under the crane spreader bar 18 by movement of the conveyor 10 aided by use of the hopper guides 60. Furthermore, the two longer containers 12 and 16 of a 40-foot length for example, may be off-loaded at the same time from the roller track path established by the three track sections 26, 28 and 30. A different length container 14, of a shorter 20-foot length for example as shown in FIG. 3, may also be handled with the central crane unit 24 positioned as the prepping platform.

Obviously, other modifications and variations of the present invention may be possible in light of the foregoing teachings. It is therefore to be understood that within the scope of the appended claims the invention may be practiced otherwise than as specifically described.

What is claimed is:

1. Apparatus for transfer of containers between a land-based vehicle and a dockside location, comprising: a wheeled conveyor moved to a position at said dockside location; roller track means mounted on the wheeled conveyor for establishing thereon a central passage lane along which movement of the containers is effected between a pair of end passage lanes in spaced relation to the central passage lane; and container spreader means mounted on the wheeled conveyor for lateral guided displacement of the container between said central passage lane established by the roller track means and the end passage lane along which the land-based vehicle may travel without obstruction into the wheeled conveyor.

2. A method for transfer of containers between a land-based vehicle and a dockside location, comprising the steps of: positioning a common track passage lane of predetermined length along which the containers are moved; establishing two parallel spaced passage lanes on opposite sides of the positioned common track passage lane along which the land-based vehicle may approach and depart without obstruction; laterally transferring the containers between the land-based vehicle and the positioned common track passage lane at longitudinally spaced locations thereon; and transferring the containers to and from the positioned common track passage lane in a vertical direction at said dockside location between said longitudinally spaced locations.

3. The method as defined in claim 2, wherein said land-based vehicle is a truck having a chassis on which the containers are carried; and said transferring of the containers in the vertical direction being effected by means of a marine terminal crane at the dockside location.

* * * * *